(12) United States Patent
Le Van Mao

(10) Patent No.: US 7,026,263 B2
(45) Date of Patent: Apr. 11, 2006

(54) HYBRID CATALYSTS FOR THE DEEP CATALYTIC CRACKING OF PETROLEUM NAPHTHAS AND OTHER HYDROCARBON FEEDSTOCKS

(75) Inventor: Raymond Le Van Mao, Saint-Laurent (CA)

(73) Assignee: Valorbec, Société en commandite, Montreal (CA)

( * ) Notice: Subject to any disclaimer, the term of this patent is extended or adjusted under 35 U.S.C. 154(b) by 194 days.

(21) Appl. No.: 10/352,770

(22) Filed: Jan. 28, 2003

(65) Prior Publication Data

US 2004/0014593 A1 Jan. 22, 2004

(30) Foreign Application Priority Data

Jan. 28, 2002 (CA) .................................. 2369318

(51) Int. Cl.
*B01J 29/06* (2006.01)
(52) U.S. Cl. ............................ 502/65; 502/63; 502/64; 502/71; 502/77; 502/73
(58) Field of Classification Search .................. 502/63, 502/64, 65, 71, 77, 73
See application file for complete search history.

(56) References Cited

U.S. PATENT DOCUMENTS

| | | | |
|---|---|---|---|
| 4,066,531 A | | 1/1978 | Owen et al. |
| 4,732,881 A | | 3/1988 | Le Van Mao .................. 502/71 |
| 4,808,560 A | | 2/1989 | Oleck |
| 5,051,385 A | * | 9/1991 | Wachter ....................... 502/64 |
| 5,290,744 A | * | 3/1994 | Degnan Jr. et al. ............ 502/67 |
| 5,554,274 A | | 9/1996 | Degnan et al. |
| 6,358,486 B1 | * | 3/2002 | Shan et al. .................. 423/326 |
| 6,558,647 B1 | * | 5/2003 | Lacombe et al. ............ 423/702 |
| 6,762,143 B1 | * | 7/2004 | Shan et al. ..................... 502/63 |
| 6,800,266 B1 | * | 10/2004 | Pinnavaia et al. ........ 423/328.1 |

FOREIGN PATENT DOCUMENTS

CA 2389536 5/2001
WO WO 01/32806 5/2001

OTHER PUBLICATIONS

Kung, *Transition metal oxides: surface chemistry and catalysis, studies in surface science and catalysis*, vol. 45:72-90, Elsevier (Amsterdam), 1989.

Le Van Mao et al., "Modification of the micropore characteristics of the desilicated ZSM-5 zeolite by thermal treatment," *Zeolitesm*, 19:270-278, 1997.

Le Van Mao et al., "Selective deep catalytic cracking process (SDCC) of petroleum feedstocks for the production of light olefins," *Catalysis Letter*, 73:181-186, 2001.

Le Van Mao et la., "Selective removal of silicon from zeolite frameworks using sodium carbonate," *Materials Chemistry*, 4:605-610, 1994.

Le Van Mao, "Hybrid catalysts containing a microporous zeolite and mesoporous cocatalyst forming a pore continuum for a better desorption of reaction products," *Microporous and Mesoporous Material*, 28:9-17, 1999.

* cited by examiner

Primary Examiner—Christina Johnson
(74) Attorney, Agent, or Firm—Fulbright & Jaworski L.L.P.

(57) ABSTRACT

Provided herein are hybrid catalysts that are used in the deep catalytic cracking of petroleum naphthas or other hydrocarbon feedstocks, for the selective production of light olefins, in particular ethylene and propylene and BTX aromatics. The hybrid catalysts of this invention contain a chemically treated microporous crystalline silicate such as the pentasil-type silicalite, a mesoporous silica-alumina or zirconium oxide co-catalyst, into which may be incorporated aluminum oxide, molybdenum oxide, lanthanum oxide, cerium oxide or a mixture of aluminum and molybdenum oxides, and an inorganic binder such as bentonite clay. These novel catalysts show several advantages with respect to the classical steam (thermal) cracking: i) higher combined production of ethylene and propylene; ii) lower ethylene/propylene ratio; iii) much lower production of methane; iv) much lower reaction temperature resulting in significant energy savings; v) easy in-situ regeneration using air as oxidant; vi) lower carbon dioxide and other volatile oxides emitted during the regeneration phase.

15 Claims, No Drawings

HYBRID CATALYSTS FOR THE DEEP CATALYTIC CRACKING OF PETROLEUM NAPHTHAS AND OTHER HYDROCARBON FEEDSTOCKS

FIELD OF THE INVENTION

The present invention relates to catalysts that are used in the deep catalytic cracking (DCC) of petroleum naphthas and other hydrocarbon feedstocks.

BACKGROUND OF THE INVENTION

Steam-cracking of light paraffins (ethane, propane and butane, obtained mainly by extraction from various natural gas sources) and of naphthas and other heavier petroleum cuts, produces:
i) primarily ethylene and propylene;
ii) secondarily, depending on the feedstock employed, a $C_4$ cut rich in butadienes and a $C_5^+$ cut with a high content of aromatics, particularly benzene; and thirdly
iii) hydrogen.

The feedstocks of choice are ethane and LPG for the U.S.A. and naphthas and gas oils for Europe. However, in recent years, the situation has dramatically changed with the U.S.A. moving towards the utilization of heavier hydrocarbon feedstocks. It is worth noting that steam cracking is one of the core processes in the petrochemical industry with a worldwide production of ca. 100 million metric tons/year of ethylene and propylene.

Steam cracking is a thermal cracking reaction performed at high temperatures and in the presence of steam, a diluent which is coifed with the hydrocarbon stream. The reaction temperature ranges from 700° C. to 900° C. according to the type of feedstock treated (the longer the hydrocarbon molecular structure, the lower the temperature of cracking), while the residence time ranges from a few seconds to a fraction of second.

Steam cracking is a well-established technology. However, it suffers from many drawbacks:
i) lack of flexibility in the product selectivity, mostly in the yield of propylene, which needs to be increased in order to respond to the increasing demand of the market.
ii) significant production of fuel oil which contains heavy hydrocarbons such as heavy alkylaromatics and even polyalkylaromatics. It is known that the latter products are precursors of <<coke>>. Coking is a serious problem in the steam cracking technology, which decreases the energy efficiency and requires non-easy decoking procedures for reactors.
iii) in order to achieve a high conversion, a high operational severity is currently used which consists mainly of using high reaction temperatures and the recycle of some gaseous paraffinic products.

A process aiming at upgrading the products of propane steam cracking was developed more than twelve years ago [1]. This process consisted of adding a small catalytic reactor to the conventional steam cracker of propane. The catalyst used was based on the ZSM5 zeolite, modified with Al and Cr [2]. Significant increases in the yield of ethylene and aromatics were obtained.

A new process, consisting of using two reactors in sequence, was recently developed [3,4]. The first reactor (I) contains a mildly active but robust catalyst, and the second reactor (II) is loaded with a ZSM5 zeolite based catalyst, preferably of the hybrid configuration. Variations of the temperature of reactor I, and the textural properties, and/or the surface composition of the catalyst of reactor (II), are used to increase the conversion and to vary the product distribution, namely the ethylene/propylene ratio.

Although such a process is of great industrial interest, the use of two reactors, which may be heated separately, represents a significant challenge in terms of technology and investment. Therefore, to change the previous two-reaction-zone technology into a one-reaction-zone technology, hybrid catalysts capable of expressing several functions [5] have been proposed. Such hybrid catalysts contain a microporous component such as a ZSM-5 zeolite or a pentasil-type silicalite, a mesoporous silica-alumina co-catalyst into which is incorporated aluminum oxide, chromium oxide or a mixture of aluminum and chromium oxides, and an inorganic binder such as bentonite clay.

There thus remains a need to develop hybrid catalysts useful in one-reaction zone technology, for the deep catalytic cracking of petroleum naphthas and other hydrocarbon feedstocks.

The present invention seeks to meet these and other needs.

The present invention refers to a number of documents, the content of which is herein incorporated by reference in their entirety.

SUMMARY OF THE INVENTION

The present invention relates to new hybrid catalysts useful in a one-reaction-zone system, and which show higher conversion and product selectivity (ethylene and propylene) as compared to the presently available hybrid catalysts.

The present invention relates to new hybrid catalysts allowing for selectively deep catalytic cracking (DCC) of petroleum naphthas and other hydrocarbon feedstocks.

The present invention further relates to a hybrid catalyst for use in deep catalytic cracking of hydrocarbon feedstocks to selectively produce light olefins, the hybrid catalyst comprising a microporous catalyst component, a mesoporous catalyst component and an inorganic binder.

In addition, the present invention relates to new hybrid catalysts having the following chemical composition (in terms of oxides and excluding the inorganic binder):

$$a\ SiO_2 \cdot b\ M_2O_3 \cdot c\ MoO_3.$$

wherein "M" is Al, Ce and La, and wherein the values of "a", "b" and "c" are defined as follows (with respect to the final hybrid catalyst:
a=0–95 wt %
b+c=5–15 wt %
c/b (molar ratio)=0.5–1.5

Further scope and applicability will become apparent from the detailed description given hereinafter. It should be understood however, that this detailed description, while indicating preferred embodiments of the invention, is given by way of illustration only, since various changes and modifications within the spirit and scope of the invention will become apparent to those skilled in the art.

DETAILED DESCRIPTION OF THE INVENTION

The present invention relates to new hybrid catalysts which are advantageously used in the deep catalytic cracking of petroleum naphthas and other hydrocarbon feedstocks (including light parafins), for the selective production of light olefins, namely ethylene, propylene and butenes, more particularly isobutene. BTX aromatics, mainly benzene, are also produced in significant amounts.

The concept leading to the preparation of the hybrid catalysts of the present invention is based on the hybrid catalyst configuration [2]. This configuration takes advantage of the possibility of transferring the reaction intermediates, during the catalytic reaction, from the microporous component to the mesoporous component, using an effect that is due to the pore continuum [2].

In a preferred embodiment, the present invention provides for the following results:

i) in terms of catalyst performance relative to steam cracking:
   a) higher combined yields of ethylene and propylene products;
   b) production of insignificant amounts of fuel oil (it is worth noting that these heavy hydrocarbons, in particular polyalkylaromatics and others, are produced in very significant amounts when using the current steam cracking technology);
   c) production of dramatically reduced amounts of methane;
   d) on-stream stability of the hybrid catalysts exceeds 6 hours;
   e) total recovery of the catalyst's activity and selectivity, following regeneration;
   f) no need for reduction of the fresh catalyst or the regenerated catalyst, even tough some induction period (a few minutes) is reported for all the runs; and
   g) no apparent damage of the catalyst's surface (surface area) and no changes in the chemical composition are observed even after multiple "reaction/regeneration" cycles.

ii) in terms of the technology being used by the catalysts of the present invention:
   a) only one catalyst is loaded into a reactor, which may have a very simple tubular configuration;
   b) the reaction temperature is reduced by more than 120° C. as compared to the temperature for steam cracking, implying significant energy savings;
   c) the catalysts are regenerated "in-situ", by exposure to air at a temperature ranging from about 550° C. to about 590° C. for a few hours;
   d) the on-stream stability, and the relative ease of regeneration of the catalysts of the present invention, provide for the use of a simple reactor configuration: a dual system of tubular reactors (one in working conditions and the other in regeneration phase);
   e) the production of carbon dioxide and other related volatile oxides during the regeneration phase is significantly reduced since the carbonaceous deposits on the catalyst of the present invention are much less important than those found on the walls of the currently used steam-cracking reactors, meaning that when using the catalyst of the present invention, the production of environmentally harmful gasses ("green house gasses") such as carbon dioxide, methane, etc.) is substantially reduced.

In a further preferred embodiment, the hybrid catalysts comprise:
   a) a microporous crystalline silicate having slightly acidic properties, similar to the ammonium-treated pentasil-type silicalite;
   b) a mesoporous alumina-silica having slightly acidic properties and having a large surface area, into which may be incorporated aluminum oxide, molybdenum oxide or a mixture of aluminum and molybdenum oxides;
   c) an inorganic (essentially catalytically inert) binder, such as bentonite clay.

In yet a further preferred embodiment, the hybrid catalysts of the present invention comprise:
   a) a microporous component having isolated acidic active centers, dispersed in a subnanometric channel network;
   b) a mesoporous co-catalyst component whose surface exhibits Bronsted acid sites;
   c) an inert binder whose role is to embed in its rigid matrix, the micron-sized particles of the two catalytic components, in order to favor the transfer of reacting molecules.

Since steam cracking remains the driving force for the total conversion of the feed, the presence of steam as well as relatively high reaction temperatures (ca. 700° C.) are required. Both catalyst components should therefore show high thermal stability under harsh reaction conditions.

Procedure for Catalyst Prepartion

A. Reference Catalysts:

H-ZSM5 Zeolite Catalyst (Herein Referred to as HZSM5):
This catalyst (Zeocat PZ-2/50, H-form, 1/16" extrudates) was purchased from Chemie Uetikon AG (Switzerland), and contains ca. 20 wt % of an unknown binder. Prior to catalytic testing, it was activated overnight in air at 700° C. Its main physical properties are:
surface area=389 $m^2/g$;
microporosity=177 $m^2/g$; and
Si/Al=ca. 50.

Silica-Alumina Catalyst (SiAl) (Herein Referred to as SiAl):
This catalyst was obtained by extrusion of silica-alumina (Aldrich, support grade 135, $SiO_2$=86 wt %, $Al_2O_3$=13 wt %, surface area=455 $m^2/g$, average pore size=6.5 nm) with bentonite clay (Spectrum Products) as follows: The silica-alumina was carefully mixed with bentonite, (stirring an hour under dry conditions) which was used as binder (15 wt %). Water was then added dropwise until a malleable paste was obtained. The resulting extrudate was dried overnight in air at 120° C., and was then activated at 500° C. for 3 hours and finally at 750° C. for 2 hours.

H-Silicalite Catalyst (HSil) (Herein Referred to as H-Sil):
75 g of silicalite (UOP, MHSZ-420, $SiO_2$=99.8 wt %, Si/Al>300) was immersed in 500 ml of a solution of ammonium chloride (10 wt %). The suspension was left at room temperature for 12 hours while being continuously stirred. It was then left to settle and filtrated. The so-obtained solid was once again immersed in a solution of ammonium chloride (500 ml). The repeated ion-exchange operation was carried out for another 12 hours. The solid was filtered out, washed with distilled water, and dried overnight in air at 120° C. The solid was finally activated at 500° C. for 3 hours. The resulting material is herein referred to as HSil (powder).

The final catalyst extrudates were obtained by extrusion with bentonite (15 wt %), followed by overnight drying at 120° C., and air activation at 500° C. for 3 hours and finally at 750° C. for another 5 hours.

B. Hybrid Catalysts Cat $IV_a$:
The Cat $IV_a$ hybrid catalysts were prepared by admixing (x) g of SiAl (pure silica-alumina) with (y) g of H-Sil (powder), wherein x+y=10, with x varying from 3 to 6. The solid mixture was then extrudated with bentonite clay (15 wt %). The resulting extrudates were first dried overnight in air at 120° C., followed by activation at 500° C. for 3 hours, and finally by activation at 750° C. for 2 hours. These catalysts are herein referred to as $HYB_a$ (Y), Y being the weight percent of HSil (powder) in the initial solid mixture.

C. Hybrid Catalysts Cat $IV_b$:

The Cat $IV_b$ hybrid catalysts were prepared by admixing (x) g of Cocat (co-catalyst) with (y) g of H-Sil (powder). The solid mixture was then extrudated with bentonite clay (1.5 g). The resulting extrudates were first dried overnight in air at 120° C., followed by activation at 500° C. for 3 hours, and finally by activation at 750° C. for 2 hours.

The hybrid catalysts of this series were obtained using solid mixtures having the following compositions:

(Mo-0): x=5.0 g of Mo-0 Cocat; y=5.0 g of HSil
(MoAl-1): x=5.0 g of MoAl-1 Cocat; y=5.0 g of HSil
(MoAl-2): x=5.0 g of MoAl-2 Cocat; y=5.0 g of H-Sil
(MoAl-3): x=5.0 g of MoAl-3 Cocat; y=5.0 g of HSil
(MoAl-4): x=5.0 g of MoAl-4 Cocat; y=5.0 g of HSil
(Al-0): x=5.0 g of Al-0 Cocat; y=5.0 g of HSil
(MoAl-31): x=4.5 g of MoAl-3 Cocat; y=5.5 g of HSil
(MoAl-32): x=4.0 g of MoAl-3 Cocat; y=6.0 g of HSil
(MoAl-33): x=3.0 g of MoAl-3 Cocat; y=7.0 g of HSil Preparation of the Co-Catalyst Herein Referred to as Cocat:

The co-catalysts were obtained by incorporating molybdenum (oxide), aluminum (oxide), or a mixture thereof, into the silica-alumina in accordance with the following procedures:

Co-catalyst for the Mo-O Sample:

A solution of 0.64 g of ammonium molybdate, $(NH_4)_6Mo_7O_{24}.4H_2O$ (ACS reagent, Anachemia) in 8.0 ml of distilled water, was impregnated into 5.0 g of silica-alumina (total amount of $MoO_3$ incorporated=3.6 mmol). The resulting solid was slowly dried on a hot plate, followed by overnight drying at 120° C. It was then activated at 250° C. for 2 hours and finally at 500° C. for another 2 hours.

Co-Catalyst for the Al-0 Sample:

A solution of 3.14 g of aluminum nitrate, $Al(NO_3)_3.9H_2O$ (Fisher Sc. Company) in 8.0 ml of distilled water, was impregnated into 5.0 g of silica-alumina (total amount of $Al_2O_3$ incorporated=4.2 mmol). The resulting solid was slowly dried on a hot plate, followed by overnight drying at 120° C. It was then activated at 250° C. for 2 hours and finally at 500° C. for another 2 hours.

Co-Catalysts for the MoAl Samples:

A solution of (x) g of aluminum nitrate and (y) g of ammonium molybdate in 8.0 ml of distilled water, was impregnated into 5.0 g of silica-alumina. The resulting solid was slowly dried on a hot plate, followed by overnight drying at 120° C. It was then activated at 250° C. for 2 hours and finally at 500° C. for another 2 hours.

(x) and (y) as mentioned above had the following values:
MoAl-1 sample: (x)=1.60 g; (y)=0.45 g; $MoO_3/Al_2O_3$ molar ratio=1.3; total amount incorporated=4.6 mmol.
MoAl-2 sample: (x)=3.23 g; (y)=0.46 g; $MoO_3/Al_2O_3$ molar ratio=0.65; total amount incorporated=6.0 mmol.
MoAl-3 sample: (x)=2.27 g; (y)=0.51 g, $MoO_3/Al_2O_3$ molar ratio=1.0; total amount incorporated=5.9 mmol.
MoAl-4 sample: (x)=3.21 g; (y)=0.75 g, $MoO_3/Al_2O_3$ molar ratio=1.0; total amount incorporated=8.5 mmol.

D. Hybrid Catalysts Cat $IV_c$:

The Cat $IV_c$ hybrid catalysts were prepared by admixing 5.0 g of pure silica-alumina, or MoAl-3 Cocat with 4.0 g of H-DSil. The solid mixture was then extrudated with bentonite clay (1.5 g). The resulting extrudates were first dried overnight in air overnight at 120° C., followed by activation at 500° C. for 3 hours, and finally by activation at 750° C. for 2 hours.

The hybrid catalysts were obtained using solid mixtures having the following compositions:

(SiAl-1): 5.0 g of pure silica-alumina; 5.0 g of H-DSil
(MoAl-3D): 4.0 g of MoAl-3 co-catalyst; 6.0 g of H-DSil Preparation of the Desilicated Silicalite Herein Referred to as H-DSil:

26.0 g of silicalite were added to Teflon beaker containing 260 ml of a 0.6 mol/L sodium carbonate solution, in accordance with the desilication method previously developed [6,7]. The suspension was heated to 80° C. for 1.5 hours while moderately stirring. It was then filtered and the solid so-obtained was placed in a beaker containing 260 ml of distilled water. The suspension was heated to 80° C. for 0.5 hours while moderately stirring. The solid was recovered by filtration, washed with distilled water and finally dried overnight in air at 120° C. The resulting solid material was immersed in a solution of ammonium chloride (180 ml; 10 wt. %). The resulting suspension was left at room temperature for a period of 12 hours, while being continuously stirred. It was then left to settle and filtered. The so-obtained solid was again immersed in an ammonium chloride solution (180 ml; 10 wt. %). The new ion-exchange operation was carried for a period of 12 hours. The solid was filtrated out, washed with distilled water, dried overnight in air at 120° C., and finally activated at 500° C. for 3 hours. The resulting material is herein referred to as H-DSil (powder).

Preparation of $(MoAl-32)_b$ and $(MOAl-D3)_b$ 8.2 g of (MoAl-32) and (MoAl-3D) extrudates were each impregnated with 6 ml of zirconyl nitrate, obtained by dissolving 1.40 g of $ZrO(NO_3)_2.4H_2O$ (Aldrich Company) in 12 ml of distilled water. The resulting materials were slowly dried on a hot plate, followed by overnight drying at 120° C. The catalyst samples, herein referred to as $(MoAl-32)_b$ and $(MoAl-D3)_b$ respectively, were obtained by activation in air at 500° C. for 2 hours followed by activation at 750° C. for another 2 hours.

E. Hybrid Catalysts Used for Testing with Ultramar Light Naphtha:

Microporous Component

Preparation of Silicalite in Acidic Form, Herein Referred to as the H-Sil Catalyst)

225.0 g of silicalite (UOP, HISIV-3000 powder, Si/Al>200), dried overnight at 120° C., was placed in a beaker containing 1500 ml of an ammonium chloride solution prepared by dissolving 150 g of ammonium chloride in 1500 ml of water (ca. 10 wt %). The suspension was stirred at room temperature for 24 hours. It was then left to settle and filtered. The so-obtained solid was again immersed in a fresh ammonium chloride solution and stirred at room temperature for 24 hours. The solid was filtered out, washed with distilled water (1000 ml), and dried overnight at 120° C. The solid was finally activated in air at 550° C. for 3 hours.

ZSM-5 Zeolite Catalyst (HZ)

This catalyst (Zeocat PZ-2/100H, powder, Si/Al=100, acidic form) was purchased from Zeochem-Uetikon. It was dried overnight at 120° C.

Co-Catalyst 1

100.0 g of silica-alumina (Aldrich, support grade 135), dried overnight at 120° C. was impregnated with a suspension obtained by vigorously mixing solutions A and B (homogeneous suspension having a yellow-pink color).

Solution A: 16.9 g of ammonium molybdate (ACS reagent, Anachemia) dissolved in distilled water (100 ml);

Solution B: 5.3 g of cerium (III) nitrate hexahydrate (Aldrich) dissolved in distilled water (80 ml).

The resulting solid material was left at room temperature for 0.5 hours, dried overnight in air at 120° C., and activated at 550° C. for 3 hours.

Co-Catalyst 2

20 g of zirconium(IV) oxide ($ZrO_2$, Aldrich), dried overnight at 120° C., was impregnated with a suspension obtained by vigorously mixing solutions A and B (homogeneous suspension of a white color).

Solution A: 3.4 g of ammonium molybdate (ACS reagent, Anachemia) dissolved in distilled water (10 ml);

Solution B: 1.2 g of lanthanum (III) nitrate hydrate (Aldrich) dissolved in distilled water (16 ml).

The resulting solid material was left at room temperature for 0.5 hours, dried overnight in air at 120° C., and activated at 550° C. for 3 hours.

Hybrid Catalyst DC 1

The DC 1 hybrid catalyst was prepared by extruding zeolite HZ with Co-catalyst 1 as follows:

5.0 g of HZ, 3.1 g of co-catalyst 1, and 2.0 g of bentonite (Aldrich, dried overnight at 120° C.) were placed in a mortar and thoroughly crushed-mixed. Water was then added until a malleable paste was obtained. The resulting solid was dried overnight in air at 120° C., and finally activated in air at 650° C. for 3 hours. Before use, the so-obtained solid was cut into short extrudates of a few millimeters in length.

Hybrid Catalyst DC 2

The DC 2 hybrid catalyst was prepared by extrusion and activation at high temperatures as was described for Catalyst DC 1. The initial composition consisted of 5.0 g of HSil, 3.1 g of co-catalyst 1 and 2.0 g of bentonite (Aldrich, dried overnight at 120° C.).

Hybrid Catalyst DC 3

The DC 3 hybrid catalyst was prepared by extrusion and activation at high temperatures as was described for Catalyst DC 1. The initial composition consisted of 3.1 g of HSil, 5.0 g of co-catalyst 2, and 2.0 g of bentonite (Aldrich, dried overnight at 120° C.).

Hybrid Catalyst DC 4

The DC 4 hybrid catalyst was prepared by extrusion and activation at high temperatures as was described for Catalyst DC 1. The initial composition consisted of 9.6 g of co-catalyst 2, 2.4 g of bentonite (Aldrich, dried overnight at 120° C.).

Experimental Set-Up

Experiments were performed using a Lindberg tubular furnace, coupled to a Lindberg type 818 temperature control unit. The reactor vessel consisted of a quartz tube 95 cm in length and 2 cm in diameter. The temperature of the catalyst bed (6.5 cm in length) was measured using a thermocouple placed in a quartz thermowell, which was positioned exactly in the middle of the catalyst bed.

Testing Procedure

Liquids, namely n-hexane (or n-octane) and water, were injected into a vaporizer using a double-syringe infusion pump and using nitrogen as the carrier gas. The water/n-hexane ratio was monitored using syringes of different diameters. In the vaporizer, the carrier gas was mixed with n-hexane (or n-octane) vapors and steam. The gaseous stream was then sent into a tubular reactor which contained the catalyst extrudates previously prepared. The products were analyzed by gas chromatography using a PONA capillary column for liquid phases and a GS-alumina capillary column for gaseous products.

The testing conditions were as follows:

| | |
|---|---|
| Weight of catalyst: | 7.5 g; |
| W.H.S.V.: | 0.6 $h^{-1}$; |
| Water/n-paraffin weight ratio: | 0.71; |
| Reaction temperature: | 715–735° C.; |
| Nitrogen flow-rate: | ca. 11.5 ml/min; |
| Duration of a run: | 4–5 hours. |

Testing Procedure Using the Ultramar Light Naphtha

The light naphtha was obtained from Ultramar Co. (Quebec, Canada) and has the following characteristics:

| | |
|---|---|
| Density: | 0.65 g/ml; |
| Composition (wt %): | paraffins: 48.1; |
| | isoparaffins: 34.5; |
| | naphthenes: 13.7; |
| | aromatics: 3.7. |

Experiments were performed using a Lindberg triple zone series tubular furnace, coupled to a Lindberg control unit capable of individually regulating, the temperature of each zone. The reactor vessel consisted of a quartz tube 95 cm in length and 2 cm in diameter.

Zone 1 (ca. 15 cm in length), located at the reactor inlet, and heated at T1 was packed with quartz granules (void volume=0.45 ml/ml, such that the volume heated at T1 is about 22 ml).

Zone 3 (catalyst be of ca. 7 cm in length), located at the reactor outlet, and heated at T3 was packed with catalyst extrudates.

Several thermocouples were used to control the temperature of these zones. Zone 2, which is sandwiched between Zones 1 and 3, was used as a cooling zone, because temperature T1 was always set slightly higher than temperature T3.

The testing conditions are as follows:

| | |
|---|---|
| Weight of catalyst: | 6.5 g; |
| Flow-rate of water: | 3.3 g/hour; |
| Flow-rate of light naphtha: | 10 ml/hour; |
| Water/naphtha weight ratio: | 0.5; |

Weight hourly space velocity (W.H.S.V.), for catalyst of zone 3: 1.51 $h^{-1}$;

Residence time (estimated), for Zone 1: ca. 3.6 s.

Each run starts with the pumping of water (for 15 min) before introducing the naphtha feed into the vaporizing flask.

Duration of a run: 5 hours;

| | |
|---|---|
| Reaction temperature: | T1 = 720–735° C.; |
| | T3 (catalyst bed) = 640° C. |
| Decoking (regeneration): | air (flow-rate 40 ml/min) at 500° C. overnight. |

Results and Discussion

Table 1 shows that the parent ZSM-5 zeolite (column #2) produces less "ethylene+propylene" than the current steam cracking process (column #1). As expected, the propylene and aromatics yield, as well as the yield of light paraffins is high. Since the reaction temperature is lower, methane production is also much lower. However, the H-ZSM5 catalyst is considerably on-stream unstable, due to its narrow pore network (coking). It is also unstable over several reaction-regeneration cycles, due to a gradual structural collapse upon the joint action of high reaction temperature and steam.

Table 1 also reports that steam-cracking (no catalyst or with bentonite extrudates, which are assumed to be catalytically inert) of n-hexane and n-octane (two paraffins used as model molecules for petroleum naphthas), results in lower conversion when tested under the DCC conditions of the present invention. However, the ethylene/propylene weight ratio is significantly higher while the combined production of ethylene and propylene is quite similar to (with n-hexane feed) or higher than (with n-octane feed) that of the naphtha steam-cracking (columns #3–7 versus column #1). It is worth noting that the production of methane, and the coking rate (which produces carbon oxides during the regeneration phase with air), is much lower.

Considering the catalytic data of the reference catalysts reported in Table 2:
 (a) the silicalite catalyst, HSil (column 1, Table 2), is slightly more active than the steam-cracking carried out under the same reaction conditions (columns #3 and 6). The production of methane by the H-Sil catalyst is also significantly lower;
 (b) the silica-alumina catalyst (column #6, Table 2) is significantly more active than the HSil catalyst (column #1, Table 2). However, it yields significantly higher amounts of methane and aromatics, while the combined production of ethylene and propylene is much lower.
 (c) the hybrid catalysts show a conversion level that is situated in between those of the HSil and the SiAl catalysts (columns #2–5). More importantly, the combined production of ethylene and propylene is significantly higher when compared to the reference catalysts, while the yields in aromatics and in methane did not change when compared to the HSil catalyst. This clearly indicates that there exists a synergistic effect between the two catalyst components during the conversion of n-hexane.

Table 3 shows that the incorporation of $MoO_3$ or $Al_2O_3$, or a mixture of these two species, onto the co-catalyst surface (silica-alumina), significantly increases both the total conversion of n-hexane and the combined yield of ethylene and propylene. It is remarkable that the production of methane does not change significantly. The highest combined production of ethylene and propylene was obtained with a ($MoO_3/Al_2O_3$) molar ratio of 1.0 (columns #4 and 5, Table 3).

Table 4 shows that varying the relative percentages of the two catalyst components, induces changes in the product spectrum. The best performance, in terms of combined production of ethylene and propylene, is obtained with the MoAl-32 hybrid catalyst, i.e., the co-catalyst with a $MoO_3/Al_2O_3$ molar ratio equal to 1.0 and a HSil/co-catalyst weight ratio of 60/40 (column #6 versus columns #2 and 7 of Table 4 and column #4 of Table 3).

Desilication of the silicalite results in slightly more acidic materials (HDSil) which when incorporated into a hybrid catalyst lead to a combined production of ethylene and propylene that is not significantly lower than the analogous hybrid catalyst prepared with HSil (column #3 of Table 5 versus column #6 of Table 4), while the yield in methane is extremely low because of the considerably lower reaction temperature.

The incorporation of $ZrO_2$ into the final catalyst extrudates mechanically strengthens them without changing their catalytic properties (column #4,versus column #3, all of Table 5).

Results Obtained Using Ultramar Light Naphtha

The catalytic performance of the DC 1 and DC 2 hybrid catalysts are reported in Table 6. Columns 1 and 2 of Table 6 allow for a comparison between the DC 1 and DC 2 hybrid catalysts, which differ only by the microporous component used in their preparation. The catalytic performances are very similar under essentially identical reaction conditions. Hybrid catalyst DC 1 is actually slightly more active than hybrid catalyst DC 2, due to a slightly higher surface acidity, which depends on the silica/alumina ratio. This small difference only has a small affect on the overall catalytic behavior of the hybrid catalyst. Columns 3 to 7 of Table 6, show the stability of the DC 2 hybrid catalyst over several cycles of "run followed by regeneration". It is worth noting that the temperature T1 was increased by 5° C. with respect to that of the run illustrated in column 2. It thus appears thus that when using a slightly higher cracking temperature, the ethylene and the aromatics yield increase significantly. The production of methane is unfortunately also higher.

The results reported in columns 3–7 of Table 6 indicate that the DC 2 hybrid catalyst is very stable over several testing cycles (reaction followed by regeneration), as is evidenced by the high reproducibility of the yield data. It is believed that this catalyst stability stems from the stability of the co-catalyst surface. In fact, it is well known that molybdenum oxide is quite unstable at high temperatures and in the presence of water. The conversion, therefore, of this oxide into stable cerium molybdate, enhances the co-catalyst stability.

The catalytic performance of the DC 2, DC 3 and DC 4 catalysts are reported in Table 7. As can be seen from Table 7, T1 was set at 735° C. and T2 at 640° C. Higher cracking temperatures again result in higher yields of ethylene and aromatics, as be observed by comparing column #1 (DC 2) of Table 7 with columns 3–7 of Table 6.

The main difference between hybrid catalyst DC 3 (column #2 of Table 7) and hybrid catalyst DC 2 (column #1, Table 6) resides in the acidity and the composition of the co-catalyst surface. More specifically, these differences are inherent to both the acidic support (zirconia versus silica-alumina), and the stabilizing species used (lanthanum versus cerium). Zirconia is known to be slightly more acidic than silica-alumina. Zirconia, however, has a smaller surface area than silica alumina (ca. 50 m²/g versus ca. 400 m²/g). Lanthanum species are said to be less aromatizing than cerium species, even though lanthanum, like cerium, promotes the formation of stable lanthanum molybdate. The combined effect of these changes leads to a higher combined yield of ethylene and propylene, and a lower production of aromatics. However, the butadiene yield is much higher (column 2 versus column 1, both of Table 7) because of a reduced consumption of butadiene resulting from cracking in zone 1, which is due to the reduced aromatization effect of lanthanum.

The catalytic data of hybrid catalyst DC 4, in which the microporous component is totally absent, are reported in column #3 of Table 7. While the combined yield of ethylene and propylene is quite high, the yield of butadiene is also much higher. This result suggests that the microporous component (zeolite or acidic silicalite) of hybrid catalysts DC 1 or DC 2 contributes more to the conversion of butadiene into aromatics than into light olefins. The new co-catalysts DC 3 and DC 4 ensure a much lower production of the greenhouse gas methane as compared to co-catalyst DC 2 (columns #2 and 3 versus column #1, all of Table 7).

The present reactor configuration having two reaction zones, i.e., a zone for partial steam-cracking (Zone 1) and a zone for catalytic conversion (Zone 3), anticipates potential industrial applications. In fact, only minor changes are required to incorporate the process of the present invention into existing steam-cracking technology. An existing steam-cracker can be used as Zone 1 (obviously using operating conditions close to those reported for the present invention), while Zone 3 can be incorporated into a steam-cracking plant as a fixed (or fluidized) bed catalytic reactor. All remaining sections of the steam-cracking plant remain unchanged. The present technology can be used for improving the current steam-cracking of hydrocarbons (light paraffins, naphthas, heavier feedstocks) with little capital investments.

It is worth to dwell on the following aspects of the hybrid catalysts of the present invention:
a) the concept of "pore continuum" applies to hybrid catalysts where enhancements in activity and selectivity for the production of desired olefinic products (ethylene and propylene) can be reasonably attributed to an "easier communication" between the two catalyst components;
b) any intervention on the co-catalyst's surface, e.g. the incorporation of metal oxides such as $V_2O_5$, or the incorporation of mixtures of metal oxides such as $Cr_2O_3/Al_2O_3$, $MoO_3/Al_2O_3$, $WO_3/Al_2O_3$, $Re_2O_7/Al_2O_3$, capable of developing mild Bronsted surface acidity [7], has a significant effect on the conversion and product selectivity;
c) stronger effects on the conversion and product selectivity are obtained even with a limited increase in the Bronsted surface acidity of the microporous component. This can be ascribed to a narrower pore size of the molecular sieve component of the hybrid catalyst, which induces a slower diffusion of the reacting molecules, favoring their adsorption (onto the active sites)/reaction/and desorption;
d) there is always an optimum (in terms of product selectivity) weight ratio of microporous component to mesoporous co-catalyst component;
e) an organic matrix embedding the two types of particles i.e. mesoporous co-catalyst component and microporous component, fixes their respective position;
f) the incorporation of zirconium species into the final catalyst extrudates mechanically strengthens them without significantly changing their catalytic performance.

The hybrid catalysts of the present invention are not only very stable on-stream, but they are also readily regenerated in-situ by heating the reactor overnight in air to ca. 550° C. The emissions of carbon oxides during the regeneration phase are reduced by at least 90% with respect to those observed using a current steam-cracking reactor. Low emissions of carbon oxides (regeneration phase) and low production of methane (methane and carbon dioxide being known "green-house gases") implies that deep catalytic cracking, using the hybrid catalysts of the present invention, represents a much "cleaner" process. The yields of methane reported for the hybrid catalysts of the present are reduced by more than 50%, as compared to those observed during steam-cracking (Table 1, column #1).

TABLE 1

Reference data of steam-cracking and catalytic cracking performed in deep catalytic cracking conditions.

| Column # | 1 | 2 | 3 | 4 | 5 | 6 | 7 |
|---|---|---|---|---|---|---|---|
| Process | STEAM CRACKING | | | | DEEP CATALYTIC CRACKING | | |
| Feed | Medium-range naphtha | n-hexane | | n-octane | n-hexane | | n-octane |
| Catalyst | / | H-ZSM5 | / | / | bentonite extrudates | | |
| Process conditions | Industrial high severity T = 850° C. | 650° C. R = 0.36 a | 735° C. 0.71 b | 735° C. 0.71 b | 725° C. 0.71 b | 735° C. 0.71 b | 735° C. 0.71 b |
| Yields (wt. %) | | | | | | | |
| Ethylene | 33.6 | 21.1 | 29.6 | 36.0 | 27.0 | 29.3 | 35.4 |
| Propylene | 15.6 | 23.5 | 20.6 | 21.6 | 20.6 | 21.2 | 22.0 |
| Butadiene | 4.5 | 0.0 | 3.1 | 3.8 | 3.3 | 3.1 | 3.6 |
| Butenes | 3.7 | 6.4 | 4.7 | 5.5 | 5.7 | 5.6 | 5.8 |
| Aromatics | 11.9 | 14.1 | 2.1 | 2.8 | 0.5 | 0.8 | 3.7 |
| Non-aromatics | 6.8 | 3.3 | 4.5 | 5.5 | 3.2 | 3.7 | 5.5 |
| Fuel oil ($C_9^+$) | 4.7 | trace | 0.2 | 0.0 | 0.0 | 0.0 | 2.3 |
| Methane | 17.2 | 7.2 | 10.4 | 8.7 | 9.3 | 9.7 | 8.0 |

TABLE 1-continued

Reference data of steam-cracking and catalytic cracking performed in deep catalytic cracking conditions.

| Column # | 1 | 2 | 3 | 4 | 5 | 6 | 7 |
|---|---|---|---|---|---|---|---|
| Other light parafins | 0.5 | 23.0 | 4.3 | 7.9 | 4.0 | 4.2 | 8.6 |
| Conversion (wt. %) | 98.5 | 98.6 | 79.5 | 91.8 | 72.9 | 77.7 | 92.8 |
| Ethylene + Propylene | 49.2 | 44.6 | 50.2 | 57.6 | 47.5 | 50.5 | 57.4 |
| Ethylene/Propylene | 2.2 | 0.9 | 1.4 | 1.7 | 1.3 | 1.4 | 1.6 |
| Light olefins and diolefins | 57.9 | 51.0 | 58.1 | 66.9 | 55.9 | 59.2 | 66.7 |
| Notes and Remarks | | On-stream unstable | | | | Very stable | |

R = H$_2$O/hydrocarbon feed ratio (by weight) Weight hourly space velocity: a = 0.3–0.4 h$^{-1}$ and b = 0.6 h$^{-1}$.

At T = 850° C. and R = 0.71, the steam-cracking of n-hexane gave similar product yields. However, rapid coking of the reactor walls with a consequent rapid activity decay (steady increase of methane production) were observed.

TABLE 2

Performance of the CAT IVa, hybrid catalysts of the present invention (feed = n-hexane, T = 735° C., R = 0.71)

| Column # | 1 | 2 | 3 | 4 | 5 | 6 |
|---|---|---|---|---|---|---|
| Catalyst | Hsil | HYBa (70) | HYBa (60) | HYBa (50) | HYBa (40) | SiAl |
| Conversion (wt %) | 86.0 | 91.1 | 91.5 | 86.4 | 88.9 | 92.1 |
| Product yields (wt %) | | | | | | |
| Ethylene | 27.3 | 27.3 | 26.7 | 27.2 | 26.7 | 22.7 |
| Propylene | 24.3 | 28.2 | 28.8 | 28.5 | 28.0 | 21.4 |
| Butadiene | 2.0 | 1.1 | 1.0 | 0.9 | 1.1 | 0.9 |
| n-Butenes | 3.6 | 3.1 | 3.4 | 3.5 | 3.2 | 3.2 |
| Isobutene | 2.7 | 2.4 | 2.6 | 2.7 | 2.4 | 2.5 |
| Aromatics | 4.8 | 4.8 | 5.3 | 4.2 | 3.9 | 8.4 |
| Non-aromatics (C5–C8) | 3.4 | 1.9 | 1.9 | 1.6 | 1.7 | 2.2 |
| Fuel oil (C9+) | 0.5 | 0.3 | 0.3 | 0.2 | 0.0 | 0.1 |
| Methane | 8.3 | 8.5 | 8.3 | 8.9 | 8.6 | 15.4 |
| Other light paraffins | 9.3 | 13.6 | 13.2 | 12.6 | 13.3 | 15.4 |
| Ethylene + Propylene | 51.6 | 55.5 | 55.5 | 55.7 | 54.7 | 44.1 |
| Ethylene/Propylene | 1.1 | 1.0 | 0.9 | 0.9 | 0.9 | 1.1 |
| C2–C4 olefins & diolefins | 59.7 | 62.0 | 62.5 | 62.7 | 61.3 | 50.6 |
| Remarks: | | | high on-stream stability | | | |

TABLE 3

Performance of the CAT IVb, hybrid catalysts of the present invention (feed = n-hexane, T = 735° C., R = 0.71)

| Column # | 1 | 2 | 3 | 4 | 5 | 6 |
|---|---|---|---|---|---|---|
| Catalyst | Mo-0 | MoAl-1 | MoAl-2 | MoAl-3 | MoAl-4 | Al-0 |
| Conversion (wt %) | 94.0 | 96.2 | 96.0 | 95.9 | 97.2 | 93.7 |
| Product yields (wt %) | | | | | | |
| Ethylene | 27.4 | 27.3 | 28.3 | 28.8 | 30.1 | 28.1 |
| Propylene | 30.6 | 30.1 | 29.8 | 30.6 | 28.8 | 29.0 |
| Butadiene | 1.4 | 1.3 | 1.2 | 1.3 | 1.3 | 1.3 |
| n-Butenes | 2.6 | 2.2 | 2.4 | 1.9 | 2.1 | 2.9 |
| Isobutene | 2.1 | 1.8 | 2.0 | 2.1 | | 1.8 |
| Aromatics | 5.4 | 7.9 | 8.0 | 6.8 | 8.4 | 5.3 |
| Non-aromatics (C5–C8) | 1.3 | 1.5 | 1.8 | 1.8 | 1.8 | 2.1 |
| Fuel oil (C9+) | 0.1 | 0.3 | 0.3 | 0.1 | 0.3 | 0.3 |
| Methane | 9.2 | 8.3 | 8.5 | 8.8 | 9.4 | 8.9 |
| Other light paraffins | 13.9 | 15.4 | 13.7 | 13.7 | 13.2 | 13.4 |
| Ethylene + Propylene | 58.0 | 57.4 | 58.1 | 59.4 | 58.9 | 57.1 |
| Ethylene/Propylene | 0.9 | 0.9 | 0.9 | 0.9 | 1.0 | 1.0 |

TABLE 3-continued

Performance of the CAT IVb, hybrid catalysts of
the present invention (feed = n-hexane, T = 735° C., R = 0.71)

| Column # | 1 | 2 | 3 | 4 | 5 | 6 |
|---|---|---|---|---|---|---|
| C2–C4 olefins & diolefins | 64.1 | 62.7 | 63.7 | 64.6 | 64.1 | 63.6 |
| Remarks: | | | high on-stream stability | | | |

TABLE 4

Performance of the CAT $IV_b$, hybrid catalysts of
the present invention (R = 0.71)

| Column # | 1 | 2 | 3 | 4 | 5 | 6 | 7 |
|---|---|---|---|---|---|---|---|
| Catalyst | | | MoAl-31 | | | MOAl-32 | MoAl-33 |
| Temperature (° C.) | 725 | 735 | 725 | 735 | 725 | 735 | 735 |
| Feed | n-hexane | n-hexane | n-octane | n-octane | n-hexane | n-hexane | n-hexane |
| Conversion (wt %) | 93.9 | 97.3 | 98.2 | 98.9 | 93.7 | 97.2 | 96.4 |
| Product yields (wt %) | | | | | | | |
| Ethylene | 24.5 | 28.6 | 26.6 | 29.5 | 24.6 | 30.5 | 28.5 |
| Propylene | 32.3 | 30.2 | 32.2 | 30.6 | 31.7 | 29.3 | 29.9 |
| Butadiene | 1.3 | 1.2 | 1.6 | 1.9 | 1.3 | 1.2 | 1.2 |
| n-Butenes | 2.8 | 2.3 | 4.1 | 3.4 | 3.0 | 2.2 | 2.4 |
| Isobutene | 2.4 | 2.3 | 3.4 | 3.0 | 2.5 | 1.8 | 2.0 |
| Aromatics | 6.6 | 7.9 | 9.1 | 7.7 | 6.9 | 8.0 | 8.2 |
| Non-aromatics ($C_5$–$C_8$) | 1.5 | 1.6 | 2.6 | 3.0 | 1.9 | 1.6 | 1.7 |
| Fuel oil ($C_9$+) | 0.2 | 0.3 | 0.0 | 0.2 | 0.2 | 0.2 | 0.3 |
| Methane | 8.3 | 8.7 | 6.8 | 8.6 | 7.7 | 8.9 | 8.2 |
| Other light paraffins | 13.9 | 14.5 | 11.7 | 11.0 | 14.0 | 13.6 | 14.1 |
| Ethylene + Propylene | 56.8 | 58.8 | 58.8 | 60.1 | 56.3 | 59.8 | 58.4 |
| Ethylene/propylene | 0.8 | 0.9 | 0.8 | 1.0 | 0.8 | 1.0 | 0.9 |
| $C_2$–$C_4$ olefins & diolefins | 63.3 | 64.1 | 67.9 | 68.4 | 63.1 | 64.8 | 64.0 |
| Remarks | | | High on-stream stability | | | | |

TABLE 5

Performance of the CAT IVc hybrid catalysts of
the present invention (R = 0.71)

| Column # | 1 | 2 | 3 |
|---|---|---|---|
| Catalyst | (SIAl-1) | (SIAl-1) | (MoAl-3D) |
| Temperature (° C.) | 735 | 725 | 715 |
| Feed | n-hexane | n-hexane | n-hexane |
| Conversion (wt %) | 96.7 | 90.3 | 93.5 |
| Product yields (wt %) | | | |
| Ethylene | 28.0 | 25.5 | 22.8 |
| Propylene | 28.4 | 28.8 | 31.5 |
| Butadiene | 1.0 | 1.2 | 0.9 |
| n-Butenes | 2.2 | 3.4 | 3.5 |
| Isobutene | 1.8 | 2.7 | 1.6 |
| Aromatics | 7.6 | 5.5 | 7.8 |
| Non-aromatics (C5–C8) | 1.5 | 1.7 | 1.5 |
| Fuel oil (C9+) | 0.0 | 0.2 | 0.1 |
| Methane | 10.4 | 8.2 | 7.2 |
| Other light paraffins | 15.8 | 13.2 | 16.7 |
| Ethylene + Propylene | 56.4 | 54.3 | 54.2 |
| Ethylene/Propylene | 1.0 | 0.9 | 0.7 |
| C2–C4 olefins & diolefins | 61.4 | 61.4 | 60.2 |
| Remarks: | | acceptable on-stream stability | |

TABLE 6

Performance of CAT $IV_c$ hybrid catalyst using light naphtha feed

| | 1 | 2 | 3 | 4 | 5 | 6 | 7 |
|---|---|---|---|---|---|---|---|
| Catalyst | DC 1 | | | DC 2 | | | |
| Temperature 1 (° C.) | 720 | | | | 725 | | |
| Temperature 3 (° C.) | | | | 640 | | | |
| Product Yield (wt. %) | | | | | | | |
| Methane | 13.8 | 12.7 | 16.5 | 17.2 | 16.1 | 16.1 | 15.7 |
| Ethylene | 23.8 | 23.6 | 25.5 | 25.2 | 25.6 | 25.2 | 25.7 |
| Propylene | 22.3 | 22.1 | 21.8 | 21.5 | 21.8 | 21.3 | 21.8 |
| Butadiene | 0.2 | 0.2 | 0.2 | 0.2 | 0.2 | 0.2 | 0.2 |
| BTX aromatics | 9.2 | 8.8 | 10.2 | 10.6 | 10.0 | 9.6 | 10.1 |
| Heavy hydrocarbons | 0.3 | 0.3 | 0.5 | 0.4 | 0.4 | 0.4 | 0.4 |
| Ethylene + Propylene | 46.1 | 45.7 | 47.3 | 46.7 | 47.4 | 46.5 | 47.5 |

TABLE 7

Performance of CAT IV$_c$ hybrid catalyst using light naphtha feed

| | 1 | 2 | 3 |
|---|---|---|---|
| Catalyst | DC 2 | DC 3 | DC 4 |
| Temperature 1 (° C.) | | 735 | |
| Temperature 3 (° C.) | | 640 | |
| Product Yield (wt. %) | | | |
| Methane | 15.0 | 12.8 | 12.7 |
| Ethylene | 27.8 | 29.3 | 29.1 |
| Propylene | 21.0 | 21.4 | 20.9 |
| Butadiene | 0.2 | 1.1 | 2.3 |
| BTX aromatics | 12.7 | 10.2 | 8.2 |
| Heavy hydrocarbons | 0.6 | 0.7 | 0.4 |
| Ethylene + Propylene | 48.8 | 50.7 | 50.0 |

Although the present invention has been described hereinabove by way of preferred embodiments thereof, it can be modified without departing from the spirit and nature of the subject invention as defined in the appended claims.

REFERENCES

1. R. Le Van Mao; U.S. Pat. No. 4,732,881 (Mar. 22, 1988)
2. R. Le Van Mao; Hybrid catalysts containing a microporous zeolite and mesoporous co-catalyst forming a pore continuum for a better desorption of reaction products; Microporous and Mesoporous Materials 28 (1999), 9–17.
3. R. Le Van Mao; Selective Deep Cracking of Petroleum Naphthas and other Hydrocarbon Feedstocks for the Production of Light Olefins and Aromatics; U.S. patent application.
4. R. Le Van Mao, S. Melancon, C. Gauthier-campbell, and P. Kletniecks; Catalysis Letters 73 (2/4), (2001), 181.
5. R. Le Van Mao; Selective Deep Cracking of Petroleum Naphthas and other Hydrocarbon Feedstocks for the Production of Light Olefins and Aromatics; U.S. patent application.
6. R. Le Van Mao, S. Xiao, A. Ramsaran, and J. Yao; J. Materials Chemistry, 4(4) (1994), 605.
7. R. Le Van Mao, S. T. Le, D. Ohayon, F. Caillibot, L. Gelebart and G. Denes; Zeolites, 19 (1997), 270–278.
8. H. H. Kung, Transition metal oxides: Surface Chemistry and Catalysis, Studies in surface science and catalysis, Vol. 45, Elsevier (Amsterdam) (1989), p72–90.
9. Canadian Patent Application No. 2,369,318 filed on Jan. 28, 2002, incorporated by reference.

The invention claimed is:

1. A hybrid catalyst for use in deep catalytic cracking of hydrocarbon feedstocks to selectively produce light olefins, said hybrid catalyst comprising a microporous catalyst component, a mesoporous catalyst component and a binder, said mesoporous catalyst component comprising a support comprising a substance selected from a large surface area silica-alumina, a zirconium oxide and mixtures thereof, said support having loaded thereon a substance selected from cerium oxide, lanthanum oxide, and mixtures thereof.

2. A hybrid catalyst as defined in claim 1, wherein said microporous catalyst component is a crystalline pentasil-type silicalite.

3. A hybrid catalyst as defined in claim 2, wherein said crystalline pentasil-type silicalite is acidic.

4. A hybrid catalyst as defined in claim 2, wherein said pentasil-type silicalite is desilicated and treated with ammonium ions.

5. A hybrid catalyst as defined in claim 1, wherein said binder is a bentonite clay.

6. A hybrid catalyst as defined in claim 5, wherein said bentonite clay is present in a proportion of 9 to 25 wt. % based on the total weight of the hybrid catalyst.

7. A hybrid catalyst as defined in claim 1, wherein said support further has loaded thereon metal oxides selected from the group consisting of aluminum oxide, molybdenum oxide, and mixtures thereof.

8. A hybrid catalyst as defined in claim 7, wherein said support has loaded thereon aluminum oxide.

9. A hybrid catalyst as defined in claim 7, wherein said support has loaded thereon molybdenum oxide.

10. A hybrid catalyst as defined in claim 7, wherein said support has loaded thereon a mixture of aluminum and molybdenum oxides.

11. A hybrid catalyst as defined in claim 10, comprising a weight ratio of molybdenum to aluminum oxides of 0.5 to 1.5.

12. A hybrid catalyst as defined in claim 11, wherein said weight ratio of molybdenum to aluminum oxides is about 1.0.

13. A hybrid catalyst as defined in claim 1, comprising a weight ratio of microporous to mesoporous catalyst component of 0.25 to 4.0.

14. A hybrid catalyst as defined in claim 13, wherein said weight ratio of microporous to mesoporous catalyst component is about 1.5.

15. A hybrid catalyst as defined in claim 1, wherein said zirconium oxide is present in a proportion of 1.5 to 4.0 wt.% based on the total weight of the hybrid catalyst.

* * * * *